United States Patent Office 3,127,736
Patented Apr. 7, 1964

3,127,736
NITROFLUORO-ALKANES AS OXIDANT FOR LIQUID ROCKET PROPELLANTS
Howard W. Bost and Richard C. Doss, Bartlesville, Okla., assignors to Phillips Petroleum Company, a corporation of Delaware
No Drawing. Filed Feb. 6, 1961, Ser. No. 87,488
20 Claims. (Cl. 60—35.4)

This invention relates to liquid propellant compositions suitable for use in rocket motors, ram-jets, pulse-jets and the like. In a further aspect, this invention relates to a method of operating such motors.

A rocket or jet propulsion device, such as is discussed herein is defined as a rigid container for matter and energy, so arranged that a portion of the matter can absorb the energy in kinetic form and subsequently eject it in a specified direction. The type rocket to which my invention is particularly applied is that type rocket propulsion device designated as a "pure" rocket, i.e., a thrust producer which does not make use of its surrounding atmosphere. A rocket of the type with which my invention is concerned is propelled in response to the steps of introducing a propellant material into a combustion chamber therein, and burning it under conditions that will cause it to release energy at a high but controllable rate immediately after its entry into the combustion chamber.

Rocket propellants in liquid form are advantageously utilized inasmuch as the liquid propellant materials can be carried in a light weight, low pressure vessel and thereafter be pumped into the combustion chamber. It is thus necessary that the combustion chamber, although being strong enough to stand high pressure and temperature, need be only large enough to insure combustion. The flow of liquid propellants into the combustion chamber can be regulated at will so that the thrust resulting from continuous or intermittent bursts of power can be sustained. Intermittent burning of the fuel contributes to a longer life of the combustion chamber and of the thrust nozzle.

Liquid propellants are usually preferred over solid propellants where it is necessary to vary thrust during flight. Liquid rocket propellants can be classified as "bipropellants" and "monopropellants," and the latter can be either a single compound or mixtures of compounds. Monopropellant systems are advantageous in that they require only one tank, one pump, one nozzle, one fuel line, one set of controls, etc. Furthermore, no mixing or proportioning system is required. Those propellants involving two materials which are introduced separately into the combustion chamber are termed "bipropellants" and normally consists essentially of an oxidizer component and a fuel component.

The principal elements of a rocket motor utilizing a liquid propellant comprises a combustion chamber, exhaust nozzle, an injection system, and propellant control valves. The propellent gases are produced in the combustion chamber at pressure governed by the chemical characteristics of the propellant, its rate of consumption, and the cross-sectional area of the nozzle throat. The gases are ejected into the atmosphere through the nozzle with supersonic velocity. The function of the nozzle is to convert the pressure of the propellent gases into kinetic energy. The reaction of the discharge of the propellent gases constitutes the thrust developed by the rocket motor.

The following are objects of this invention.

An object of this invention is to provide new monopropellant compositions. Another object of the invention is to provide new bipropellant systems. A further object of this invention is to provide a method for operating rocket motors using said new monopropellant compositions and said new bipropellant systems. Other aspects, objects and advantages of the invetnion will be apparent to those skilled in the art in view of this disclosure.

In accordance with the invention there are provided new monopropellant compositions which are suitable for use according to the method of the invention in rocket motors and the like. Broadly speaking, the new monopropellants of the invention comprise a mixture of a fluoronitromethane compound as an oxidant component and a suitable fuel component.

Thus according to the invention there is provided a monopropellant composition comprising a mixture of (1) an oxidant selected from the group consisting of fluorotrinitromethane, difluorodinitromethane, trifluoronitromethane and mixtures thereof, and (2) a fuel component selected from the group consisting of ammonia, hydrazine, alcohols containing from 1 to 8 carbon atoms per molecule, nitriles containing from 1 to 8 carbon atoms per molecule, ethers containing from 2 to 10 carbon atoms per molecule, ketones containing from 1 to 8 carbon atoms per molecule, paraffin and cycloparaffin hydrocarbons containing from 5 to 12 carbon atoms per molecule, gasoline, kerosine, sulfones containing from 4 to 8 carbon atoms per molecule, benzene and alkyl substituted benzenes containing from 6 to 12 carbon atoms per molecule, and mixtures thereof.

Examples of said alcohols containing from 1 to 8 carbon atoms per molecule which can be used as the fuel component in said monopropellant compositions include, among others, the following: methanol, ethanol, propanol, isopropanol, butanol, isobutanol, sec-butanol, tert-butanol, pentanol, isopentanol, tert-pentanol, hexanol, cyclohexanol, octanol, octanol-2, and the like.

Examples of said nitriles containing from 1 to 8 carbon atoms per molecule which can be used as the fuel component in said monopropellant compositions include, among others, the following: acetonitrile, propionitrile, n-butyronitrile, isobutyronitrile, trimethylacetonitrile, capronitrile, and the like.

Examples of said ethers containing from 2 to 10 carbon atoms per molecule which can be used as the fuel component in said monopropellant compositions include, among others, the following: dimethyl ether, diethyl ether, methyl ethyl ether, diisopropyl ether, dibutyl ether, di-n-amyl ether, and the like.

Examples of said ketones containing from 1 to 8 carbon atoms per molecule which can be used as the fuel component in said monopropellant compositions include, among others, the following: acetone, methylethyl ketone, methyl-n-propyl ketone, diethyl ketone, hexanone - 1, methyl-t-butyl ketone, di-n-propyl ketone, diisopropyl ketone, n-propyl-n-butyl ketone, and the like.

Examples of said paraffin and cycloparaffin hydrocarbons containing from 5 to 12 carbon atoms per molecule which can be used as the fuel component in said monopropellant compositions include, among others, the following: n-pentane, 2-methylpentane, n-heptane, n-nonane, n-undecane, n-dodecane, dimethylethylmethane, 3-methylpentane, 2,3 - dimethylbutane, 2 - methylhexane, 3 - ethylpentane, 2,3-dimethylhexane, 2,2-dimethyloctane, 2,2-dimethylpentane, 3,3-dimethylheptane, 2,3-methylethylnonane, cyclopentane, cyclohexane, cyclooctane, cyclododecane, methylcyclopentane, and the like.

Examples of said sulfones containing from 4 to 8 carbon atoms per molecule which can be used as the fuel component in said monopropellant compositions include, among others, the following: diethylsulfone, ethylpropylsulfone, dipropylsulfone, dibutylsulfone, tetramethylenesulfone (sulfolane), and the like.

Examples of said alkyl substituted benzenes which can be used as the fuel component in said monopropellant compositions include, among others, the following: toluene, o-xylene, m-xylene, p-xylene, o-diethylbenzene, m-diethylbenzene, p-diethylbenzene, trimethylbenzene, o-ethylpropylbenzene, m-ethylpropylbenzene, p-ethylpropylbenzene, and the like..

Further according to the invention there is provided a method of developing thrust which comprises the steps of injecting said monopropellant composition into a combustion chamber of a reaction motor, igniting and burning said monopropellant, and exhausting combustion gases from said motor.

The monopropellants used in the present invention will be preferably near stoichiometric mixtures of the oxidant component and the fuel component. The ratio of fuel component to oxidant component can be in the range of 0.75 to 1.25 times that of the stoichiometric amount. A slightly fuel-rich mixture is usually required to give an optimum rocket motor performance. As used herein stoichiometric ratio is that ratio of fuel to oxidant calculated by assuming complete combustion of the various elements such as fluorine, nitrogen, hydrogen, and carbon of the fuel component to HF, $N_2$, $H_2O$, and $CO_2$, respectively.

The normally preferred procedure for preparing the monopropellants of the invention is to admix the fuel component with the oxidant component in the desired ratio at some time prior to use. It is generally preferred to add the fuel component to the oxidant component at temperatures below about 50° C., e.g., 0 to 30° C.

The monopropellants of the present invention wherein the oxidant component is fluorotrinitromethane, difluorodinitromethane, or a mixture thereof, can be conveniently ignited by contacting a stream of the monopropellant with a stream of a hypergol such as N,N,N',N'-tetramethylpropane-1,3-diamine. Any material which is hypergolic when mixed with the oxidant component can be used. The hypergol used is simultaneously injected into the combustion chamber with the two-component monopropellant to ignite the monopropellant After the two-component monopropellant is ignited, the flow of hypergol is stopped. A temperature-sensitive element, a time mechanism or other means can be used to terminate the flow of the hypergol. All of the monopropellant compositions of the present invention can also be ignited by other means such as, for example, by an electric igniter, or a flame.

Fluorotrinitromethane can be prepared by contacting tetranitromethane with an alkali metal fluoride, such as potassium fluoride, at a temperature within the range of from 0 to 100° C., preferably 10 to 30° C., in the presence of a polar organic solvent, such as dimethylformamide, as disclosed and claimed in copending application Serial No. 87,489, field February 6, 1961 by R. C. Doss.

Difluorodinitromethane can be prepared by any suitable method known to those skilled in the art. One suitable method comprises contacting 1,1-difluoro-2,3,4,5-tetrachloropentadiene-2,4 at 0° C., with stirring. The temperature is permitted to increase slowly to 40–50° C. during which time a large amount of oxidation takes place. Oxidation products are condensed and redistilled to separate the desired product, difluorodinitromethane, boiling at 58.5 to 59.0° C.

Trifluoronitromethane can also be prepared by suitable methods known to those skilled in the art. One method comprises reacting bromodifluoronitromethane with $ClF_3$ under suitable reaction conditions to the desired product, trifluoronitromethane.

EXAMPLE I

Performance characteristics of monopropellant compositions, in accordance with the invention, consisting essentially of mixtures of the listed oxidant and fuel components are presented in Table I below.

Table 1

| Oxidant | Fuel | Fuel/Oxidant wt. ratio | Temperature, °K. | | $Isp$,[1] Max., lb.-sec./lb. | $C^*$, ft./sec. |
|---|---|---|---|---|---|---|
| | | | Comb. Chamber | Exhaust | | |
| $FC(NO_2)_3$ | Ammonia | 0.304 | 3,028 | 1,605 | 265 | 5,293 |
| $FC(NO_2)_3$ | Hydrazine | 0.469 | 3,281 | 1,788 | 281 | 5,693 |
| $FC(NO_2)_3$ | Triptane | 0.151 | 3,457 | 2,053 | 270 | 5,323 |
| $FC(NO_2)_3$ | Actonitrile | 0.262 | 3,508 | 2,027 | 267 | 5,281 |
| $FC(NO_2)_3$ | Methanol | 0.313 | 3,177 | 1,894 | 261 | 5,134 |
| $F_2C(NO_2)_2$ | Ammonia | 0.249 | 2,896 | 1,385 | 251 | 5,065 |
| $F_3CNO_2$ | do | 0.150 | 2,450 | 1,000 | 218 | 4,450 |

[1] Assuming shifting equilibrium during expansion of combustion gases from 1000 p.s.i. to 1 atmosphere.

EXAMPLE II

Studies were made on the compatibility of fluorotrinitromethane, $FC(NO_2)_3$, with various compounds. These studies were made at or near room temperature by placing 0.2 ml. $FC(NO_2)_3$ in a test tube and adding approximately 0.1 gram of the material to be tested for compatability.

Compound tested: Observed results
- Acetonitrile — No reaction, miscible.
- Triptane — Do.
- Acetone — Do.
- Methanol — Do.
- Benzene — Do.
- Nitrobenzene — Do.
- Toluene — Do.
- Pyridine — Reacts, solids form.
- Sulfolane — No reaction, miscible.
- Pentene-1 — Do.
- n-Pentane — Do.
- Cyclohexene — Do.
- Cyclohexane — Do.

EXAMPLE III

Fluorotrinitromethane was not capable of detonation with a hammer blow.

The above described oxidants fluorotrinitromethane and difluorodinitromethane are also useful as the oxidant component in bipropellant fuel systems comprising at least one of said oxidants and a suitable fuel component. The bipropellant systems here contemplated are those wherein the fuel component is hypergolic with the oxidant component. In the utilization of such fuel systems a stream of the fuel component and a stream of the oxidant component are separately and simultaneously injected into contact with each other in a combustion chamber of the reaction motor in such proportions as to produce spontaneous ignition.

We have found that certain organic polyamines (defined further hereinafter) are hypergolic, i.e., ignite spontaneously, upon contacting the above-described fluoronitromethane oxidizers.

Thus, further according to the invention, there is provided a method for developing thrust by the combustion of bipropellant components, which method comprises the steps of separately and simultaneously injecting into a combustion chamber of a reaction motor and into contact with each other, in such proportions as to produce spontaneous ignition, a stream of an oxidant component selected from the group consisting of fluorotrinitromethane, difluorodinitromethane, and mixtures thereof, and a stream of a fuel component comprising at least one polyamine having the formula

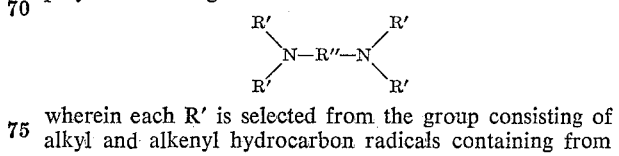

wherein each R' is selected from the group consisting of alkyl and alkenyl hydrocarbon radicals containing from 1 to 3 carbon atoms; and R″ is selected from the group consisting of (a) Alkylene, alkenylene, alkadienylene, and alkynylene hydrocarbon radicals containing from 2 to 6 carbon atoms and (b)

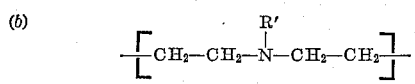

and

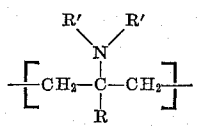

radicals wherein R′ is as defined above.

A ratio of oxidizer to hypergolic fuel, based upon stoichiometric amounts, can be utilized within the limits of 0.5:1 to 1.5:1 if desired. The efficiency of combustion is less at a ratio below 1:1 and the use of the oxidizer is less economical at ratios above 1:1. However, practical consideration may necessitate the use of higher ratios, even as high as 6:1.

Examples of said organic polyamines which can be used in the practice of the invention include, among others, the following:

N,N,N′,N′-tetraallylpropene-1,3-diamine;
N,N,N′,N′-tetramethylpropane-1,3-diamine;
N,N,N′,N′-tetramethylpropene-1,3-diamine;
N,N,N′,N′-tetramethylpropane-1,2-diamine;
N,N,N′,N′-tetramethylethane-1,2-diamine;
N,N,N′,N′-tetramethylbutane-1,2-diamine;
N,N,N′,N′-tetramethyl-1-butene-3,4-diamine;
N,N,N′,N′-2-pentamethylpropane-1,3-diamine;
N,N,N′,N′-tetramethylbutane-1,4-diamine;
N,N,N′,N′-tetramethyl-2-butene-1,4-diamine;
N,N,N′,N′-tetramethylhexane-1,6-diamine;
N,N,N′,N′-tetramethyl-1,2-diaminoethylene;
N,N,N′,N′-tetramethyl-2-butyne-1,4-diamine;
N,N,N′,N′-tetramethylbutane-1,3-diamine;
N,N,N′,N′-tetramethyl-1-butene-1,3-diamine;
N,N,N′,N′-tetramethyl-2-pentyne-1,4-diamine;
N,N,N′,N′-tetraethylethane-1,2-diamine;
N,N,N′,N′-tetraallylethane-1,2-diamine;
N,N,N′,N′,N″,N″-hexamethylpropane-1,2,3-triamine;
N,N,N′,N′,N″-pentamethyldiethylenetriamine;
1-diethylamino-4-dimethylamino-2-pentyne;
N,N,N′,N′-tetramethyl-1,3-butadiene-1,4-diamine; and mixtures of said polyamines.

EXAMPLE IV

One volume of fluorotrinitromethane was dropped into a vessel containing three volumes of N,N,N′,N′-tetramethylpropane-1,2-diamine. Said amine upon being contacted with the fluorotrinitromethane ignited spontaneously. The test was conducted at room temperature, 70–75° F.

EXAMPLE V

Performance characteristics of a bipropellant system, in accordance with the invention, consisting essentially of fluorotrinitromethane and N,N,N′,N′-tetramethylpropane-1,2-diamine are

| Fuel/Oxidizer, wt. ratio | Temperature, ° K. | | Isp,[1] Max., lb.-sec./lb. | C*, ft./sec. |
|---|---|---|---|---|
| | Comb. Chamber | Exhaust | | |
| 0.185 | 3,281 | 1,788 | 271 | 5,335 |

[1] Assuming shifting equilibrium during expansion of combustion gases from 1000 p.s.i. to 1 atmosphere.

EXAMPLE VI

In one run for the preparation of fluorotrinitromethane, 9.8 grams (0.1686 mol) of freshly prepared anhydrous KF was added to 180 ml. of dimethylformamide (DMF), and the resulting mixture was cooled to 13° C. Thirty grams (0.1775 mol) of tetranitromethane (TNM) was then added over a 5 minute period with stirring. The mixture was then stirred for 3 hours at 12–15° C. and then heated to 70° C. After cooling to room temperature, the mixture was diluted with twice its volume of water and the aqueous solution was extracted with two 100 ml. portions of ether. The ether extracts were dried over MgSO₄, filtered and distilled.

DISTILLATION RECORD

| Cut | Head Temp., °C | Pot Temp., °C | Wt., grams | R. I., $n_D^{20}$ |
|---|---|---|---|---|
| 1 | 45 | 95 | | |
| 2 | 75 | 115 | 2.0 | |
| 3 | 84 | 145 | 4.5 | |

Cuts 2 and 3 were combined and redistilled to obtain the following—

| 4 | 77 | 85 | 0.2 | 1.3864 |
| 5 | 79 | 86 | 1.0 | 1.3936 |
| 6 | 75 | 100 | 2.5 | 1.3940 |

Cuts 5 and 6 were combined and redistilled to obtain the following—

| 7 | 60–77 | 86 | | |
| 8 | 77–79 | 100 | | |

The density of cut 7 was 1.532 and the density of cut 8 was 1.560. Analysis of cut 8 by gas chromatography showed the material to be 98 percent pure fluorotrinitromethane, with less than 1 percent ether present. Elemental analysis of cut 8 gave the following results:

| Element | Calculated for $CN_3O_6F$, percent | Found, percent |
|---|---|---|
| Carbon | 7.10 | |
| Nitrogen | 24.85 | |
| Fluorine | 11.23 | 10.6 |
| Oxygen | 56.82 | |

Since many possible embodiments may be made of this invention without departing from the scope thereof, it is to be understood that all matter herein set forth is to be interpreted as illustrative and not in a limiting sense.

We claim:

1. A monopropellant composition comprising a mixture of (1) an oxidant component selected from the group consisting of fluorotrinitromethane, difluorodinitromethane, trifluoronitromethane, and mixtures thereof, and (2) a fuel component which is non-hypergolic with said oxidant component and which is selected from the group consisting of ammonia, hydrazine, alkyl and cycloalkyl alcohols containing from 1 to 8 carbon atoms per molecule, alkane nitriles containing from 1 to 8 carbon atoms per molecule, dialkyl ethers containing from 2 to 10 carbon atoms per molecule, dialkyl ketones containing from 1 to 8 carbon atoms per molecule, paraffin and cycloparaffin hydrocarbons containing from 5 to 12 carbon atoms per molecule, gasoline, kerosine, dialkyl and cycloalkylene sulfones containing from 4 to 8 carbon atoms per molecule, benzene and alkyl substituted benzenes containing from 6 to 12 carbon atoms per molecule, and mixtures thereof; and wherein the ratio of said fuel component to said oxidant component is within the range of 0.75 to 1.25 times that of the stoichiometric amount.

2. The monopropellant of claim 1 wherein said oxidant component is fluorotrinitromethane.

3. The monopropellant of claim 1 wherein said oxidant component is difluorodinitromethane.

4. The monopropellant of claim 1 wherein said oxidant component is trifluoronitromethane.

5. The monopropellant of claim 1 wherein said fuel component is ammonia.

6. The monopropellant of claim 1 wherein said fuel component is hydrazine.

7. The monopropellant of claim 1 wherein said fuel component is acetonitrile.

8. The monopropellant of claim 1 wherein said fuel component is triptane.

9. The monopropellant of claim 1 wherein said fuel component is methanol.

10. In the method for development of thrust by the combustion of a monopropellant in a combustion chamber of a reaction motor, the step comprising injecting into said combustion chamber a mixture of (1) an oxidant component selected from the group consisting of fluorotrinitromethane, difluorodinitromethane, trifluoronitromethane, and mixtures thereof, and (2) a fuel component which is non-hypergolic with said oxidant component and which is selected from the group consisting of ammonia, hydrazine, alkyl and cycloalkyl alcohols containing from 1 to 8 carbon atoms per molecule, alkane nitriles containing from 1 to 8 carbon atoms per molecule, dialkyl ethers containing from 2 to 10 carbon atoms per molecule, dialkyl ketones containing from 1 to 8 carbon atoms per molecule, paraffin and cycloparaffin hydrocarbons containing from 5 to 12 carbon atoms per molecule, gasoline, kerosine, dialkyl and cycloalkylene sulfones containing from 4 to 8 carbon atoms per molecule, benzene and alkyl substituted benzenes containing from 6 to 12 carbon atoms per molecule, and mixtures thereof; the ratio of said fuel component to said oxidant component being in the range of 0.75 to 1.25 times that of the stoichiometric amount.

11. The method of claim 10 where said oxidant component is fluorotrinitromethane.

12. The method of claim 10 wherein said oxidant component is difluorodinitromethane.

13. The method of claim 10 wherein said oxidant component is trifluoronitromethane.

14. The method of claim 10 wherein said fuel component is ammonia.

15. The method of claim 10 wherein said fuel component is hydrazine.

16. The method of claim 10 wherein said fuel component is acetonitrile.

17. The method of claim 10 wherein said fuel component is triptane.

18. The method of claim 10 wherein said fuel component is methanol.

19. In the method for development of thrust by by the combustion of bipropellant components in a combustion chamber of a reaction motor, the steps comprising separately and simultaneously injecting into said combustion chamber, in such proportions as to produce spontaneous ignition, a stream of an oxidant component selected from the group consisting of fluorotrinitromethane, difluorodinitromethane, and mixtures thereof, and a stream of a fuel component comprising at least one polyamine having the formula

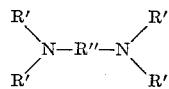

wherein each R' is selected from the group consisting of alkyl and alkenyl hydrocarbon radicals containing from 1 to 3 carbon atoms; and R'' is selected from the group consisting of (a) alkylene, alkenylene, alkadienylene, and alkylylene hydrocarbon radicals containing from 2 to 6 carbon atoms and (b)

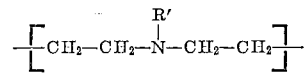

and

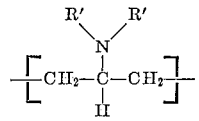

radicals wherein R' is as defined above.

20. A method for the development of thrust by the combustion of propellant components in a combustion chamber of a reaction motor, which method comprises: introducing into said combustion chamber (1) an oxidant component selected from the group consisting of fluoronitromethane, difluoronitromethane, trifluoronitromethane, and mixtures thereof, and (2) a fuel component selected from the group consisting of (A) fuel which are non-hypergolic with said oxidant component and selected from the group consisting of ammonia, hydrazine, alkyl and cycloalkyl alcohols containing from 1 to 8 carbon atoms per molecule, alkane nitriles containing from 1 to 8 carbon atoms per molecule, dialkyl ethers containing from 2 to 10 carbon atoms per molecule, dialkyl ketones containing from 1 to 8 carbon atoms per molecule, paraffin and cycloparaffin hydrocarbons containing from 5 to 12 carbon atoms per molecule, gasoline, kerosine, dialkylene and cycloalkylene sulfones containing from 4 to 8 carbon atoms per molecule, benzene, and alkyl substituted benzenes containing from 6 to 12 carbon atoms per molecule, and mixtures thereof, and (B) fuel which are hypergolic with said oxidant component and selected from the group consisting of polyamines characterized by the formula

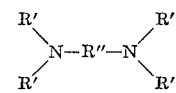

wherein each R' is selected from the group consisting of alkyl and alkenyl hydrocarbon radicals containing from 1 to 3 carbon atoms; and R'' is selected from the group consisting of (a) alkylene, alkenylene, alkadienylene, and alkynylene hydrocarbon radicals containing from 2 to 6 carbon atoms and (b)

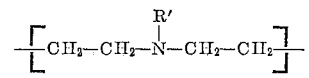

and

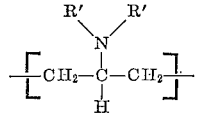

radicals wherein R' is as defined above; said oxidant component and said fuel component being introduced in combustible proportions with respect to each other; burning said oxidant and fuel components; and exhausting the products of combustion from said motor to develop said thrust.

References Cited in the file of this patent
UNITED STATES PATENTS
3,057,931    Scribner  _____ Oct. 9, 1962

UNITED STATES PATENT OFFICE
CERTIFICATE OF CORRECTION

Patent No. 3,127,736                                      April 7, 1964

Howard W. Bost et al.

It is hereby certified that error appears in the above numbered patent requiring correction and that the said Letters Patent should read as corrected below.

Column 7, line 52, strike out "by"; column 8, line 1, for "alkylylene" read -- alkynylene --; line 22, for "fuel" read -- fuels --; lines 31 and 32, for "dialkylene" read -- dialkyl --; same column 8, line 35, for "fuel" read -- fuels --.

Signed and sealed this 15th day of September 1964.

(SEAL)
Attest:

ERNEST W. SWIDER                                          EDWARD J. BRENNER
Attesting Officer                                              Commissioner of Patents